United States Patent [19]

Goldman

[11] Patent Number: 4,994,422

[45] Date of Patent: Feb. 19, 1991

[54] MICROSPHERES COATED WITH CATALYST AND METHODS OF PRODUCING SAME

[75] Inventor: Stuart O. Goldman, Scottsdale, Ariz.

[73] Assignee: Fuel Conservation Corporation, Ridgewood, N.J.

[21] Appl. No.: 482,170

[22] Filed: Feb. 20, 1990

[51] Int. Cl.$^5$ ............................................. B01J 37/34
[52] U.S. Cl. .......................................... 502/5; 502/8; 502/9; 502/10; 502/150; 502/173; 44/268; 44/300; 44/321; 44/500; 44/530
[58] Field of Search ..................... 502/5, 8, 9, 10, 150, 502/173; 44/52, 57, 66, 68

[56] References Cited

U.S. PATENT DOCUMENTS

| | | | |
|---|---|---|---|
| 3,078,662 | 2/1963 | Roccitini | 44/68 |
| 3,205,053 | 9/1965 | McCord | 44/68 |
| 4,011,730 | 3/1977 | Rosenberg et al. | 44/52 |
| 4,102,800 | 7/1978 | Popoff et al. | 502/159 |
| 4,180,384 | 12/1979 | Rice | 44/52 |
| 4,475,483 | 10/1984 | Robinson | 44/68 |
| 4,668,247 | 5/1987 | Berenyi | 44/68 |
| 4,752,302 | 6/1988 | Bowers et al. | 44/68 |
| 4,844,716 | 7/1989 | Goldman et al. | 44/68 |

*Primary Examiner*—W. J. Shine
*Assistant Examiner*—E. D. Irzinski
*Attorney, Agent, or Firm*—Richard R. Mybeck

[57] ABSTRACT

Means and methods of producing catalytically coated microspheres of hydrocarbon fuel in a tower into which precharged free floating initially frozen globules of hydrocarbon fuel are drawn through a catalytic plasma field by an attracting electrostatic force disposed thereabove for catalytic coating and partial neutralization of the globule precharge until the coated globules descends in response to gravitational forces through the plasma field into a container disposed therebeneath.

20 Claims, 1 Drawing Sheet 100 feet in height to one of not more than about
MICROSPHERES COATED WITH CATALYST AND METHODS OF PRODUCING SAME

INTRODUCTION

The present invention relates to microspheres of hydrocarbon fuel having a coating of catalyst integrally formed thereupon and to methods of producing the same. Catalytically coated microspheres of fuel produced hereby are especially useful in catalytically enhanced combustion of hydrocarbon fuels by maximizing the energy release therefrom while substantially reducing the undesirable by-product produced thereby.

BACKGROUND OF THE INVENTION

The use of energy releasing catalyst in the combustion of hydrocarbon fuels is known and, for example, is taught by Berenyi (U.S. Patent No. 4,668,247) who discloses the use of a liposoluble organometallic compound combined in a diluent oil and further processed to form a solid substance which is thereafter added to hydrocarbon fuel prior to combustion, for example, in an internal combustion engine. Others coated an inert substrate with the desired catalyst and passed the fuel over the catalyst/substrate at the time of combustion. The use of catalysis during hydrocarbon combustion has been shown to increase the energy output of the fuel and, because of the lower combustion temperature, lower the emission of the nitrogen oxides and carbon monoxides which are considered to be undesirable environmental pollutants.

The prior art preparation of catalytic agents used inert substrates for catalyst support, and catalyst/substrate mixtures for combination with hydrocarbon fuels. While use of catalyst/substrate mixtures demonstrated improved energy release, such mixtures result in substrate separation which in turn causes mechanical injector or needle valve clogging.

Confronted with these difficulties, Goldman et al (U.S. Pat. No. 4,844,716) developed a new and unique catalyst/substrate delivery system to obtain more efficient combustion of hydrocarbon fuels and at the same time, reduce the environmental pollutants emitting therefrom. The catalyst/substrate combination of Goldman et al had a particle size of greater than one micron but less than two thousand microns and was created by disposing particulate catalyst onto a frozen substrate of fuel pellets which created micro-globules having a specific gravity suitable for the intended use.

More particularly, Goldman et al, supra, allowed a proven catalyst to be delivered into a hydrocarbon fuel combustion chamber as mini-globules where it favorably influenced the efficiency of the combustion reaction by a myriad of catalytic shards which resulted from the explosion of each mini-globule. Goldman et al also eliminated inert substrate from the product of the combustion reaction thereby avoiding the distribution of such particulates into the fuel injectors and needle valves and the clogging which resulted therefrom.

With its many advances to the art, Goldman et al still suffered from the fact that it required a substantial capital investment to locate and erect the extremely tall (circa 100 ft.) tower required to practice the invention.

Thus a need still exists for further improvement in the design and production of catalytically coated microspheres which eliminates the large space and capital requirements of current technology. It is toward such improvements that the present invention is directed.

BRIEF SUMMARY OF THE INVENTION

The present invention discloses novel and unique catalytically coated microspheres of fuel and methods of making them which attains a substantial reduction in capital outlay and space heretofore required. More particularly, the means and methods herein disclosed reduces the vertical coating tower requirements of about 100 feet in height to one of not more than about 20 feet in height while producing surprisingly efficient catalytically coated microspheres as will appear. The novel means and methods hereof involve a unique and synergistic coaction between applied electrostatic potential and natural gravitational forces in a manner which will be hereinafter described in detail.

Accordingly, a prime object of the present invention is to provide new and improved means and methods to prepare microspheres coated with catalyst and useful to enhance the combustion of hydrocarbon fuels, each microsphere employing a light distillate of fuel oil as a substrate core upon which an appropriate catalyst is deposited.

Another object of the present invention is to provide a unique method for coating frozen droplets of a fuel oil distillate in which an electrostatic potential is imparted to the globule when formed at the lower end of a reaction tower which electrostatic charge allows the globule to rise in the reaction chamber in response to an opposite electrostatic charge disposed at the upper end thereof while passing through a catalytic plasma field to acquire a thin catalyst coating thereupon and increase the mass thereof until said coated sphere attains a state in which the natural gravitational force thereupon exceeds the electrostatic potential at the upperend and the sphere falls in the reaction tower back through the catalytic plasma field to be further coated and ultimately into collection means disposed therebeneath.

A still further object is to provide a unique method of creating catalytically coated microspheres in which each microsphere carries a like electrostatic charge causing it to disperse within the reactive chamber in spaced relationship to every microsphere thereby enhancing coating efficiency and effectiveness.

Still another object of the present invention is to provide a novel and unique method of producing catalytically coated microspheres coated by catalytic plasma which is electrostatically attracted to the microspheres to increase the efficiency of the coating probability of each microsphere and in which, the plasma, having an electrostatic charge opposite to that imparted to the microsphere, results in a gradual reduction of the effect of the potential applied to the microspheres, thereby reducing the electrostatic force attracting the sphere upwardly through the tower and gradually slowing the vertical rise of the microspheres through the coating range.

Still further object of the present invention is to provide a novel and unique method of creating catalytically coating microspheres in which the plasma coating upon each microsphere increases its mass thereby increasing the effect of gravitational forces upon the microsphere and further slows the vertical rise of the microsphere within the reaction tower until the gravitational force overcomes the upward electrostatic pull and the microsphere begins a slow decent down through the plasma field for collection in a vessel disposed therebeneath.

A still further object of the present invention is to provide novel and unique means and method for producing catalytically coated microspheres in which the force of the electrostatic potential applied by the catalytic plasma field tends to counteract the electrostatic potential imparted to each globule at the misting value and coacts with the pull of gravitational forces upon the increasing microsphere mass to the vertical rise of the coated globules and emerging microspheres until the action of the natural gravitational forces thereupon dominates, and the coated microsphere is drawn downwardly into a suitable collector disposed beneath the reaction tower.

These and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

DESCRIPTION OF THE PREFERRED EMBODIMENTS

Figure 1:
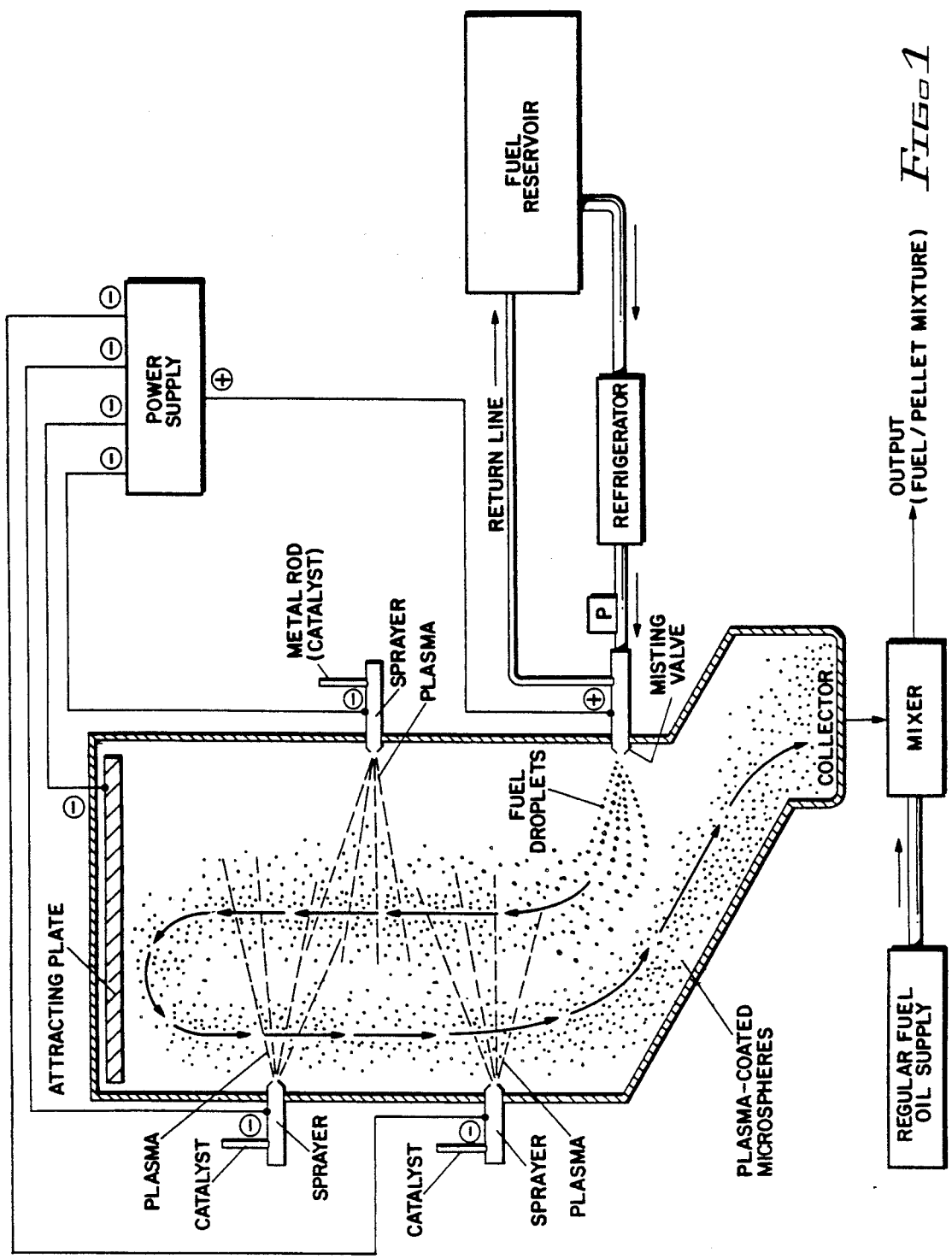
FIG. 1 is a schematic flow diagram of apparatus employed and the process of preparing and utilizing catalytically coated microspheres in accordance with the present invention.

In one practice of the present invention, as shown in the drawing, a catalyst substrate is formed by the atomization of the selected hydrocarbon, such as kerosene, light fuel oil, diesel fuel, and the like stored in the fuel reservoir into a cold environment provided by a refrigerator in which the spray is frozen. The selected hydrocarbon is chosen by its specific gravity which shall in any event not exceed and preferably be slightly less than the hydrocarbon whose combustion it will be used to promote. The frozen fuel pellets are then sprayed through a misting valve into the reactor vessel where they are coated with a plasma of an atomized catalyst such as platinum, palladium, lithium, and zirconium organometals, and the like in a manner to be hereinafter described in detail. There is no requirement for the catalyst to be soluble or partially soluble in the microsphere substrate. The frozen substrate absorbs the energy from the plasma process. Once the coating has formed, the globular core or microsphere no longer needs to remain a solid. The catalyst-coated-substrate or microshard is ultimately collected and classified for further use such as ad mixture into a regular fuel oil supply. The classification process eliminates the broken particles and retains the particles measuring from one to two thousand microns, preferrably from one to two hundred microns in diameter which have a formed catalyst shell disposed uniformly around the now-liquid hydrocarbon substrate center.

A coating tower of about twenty feet in height having an electrostatic attracting plate disposed in the top thereof which, as will be hereinafter described in detail, coacts in a unique and synergistic fashion with an electrostatic charge carried by the microspheres and natural gravitational forces to impart highly beneficial movement to previously frozen microspheres of frozen fuel while they are bombarded with and coated by catalyst emitted from one or more plasma sprays disposed strategically on the perimeter of the tower in spaced operative relationship to each other and to said attracting plate.

In a preferred practice of the present invention, frozen droplets or globules of a fuel oil distillate are created having an electrostatic potential imparted thereto adjacent to the lower end of a reaction tower whereupon the electrostatic charge causes the globules to rise in response to an oppositely charged (ergo, attracting) electrostatic member disposed at the upper end thereof. The globules, as they rise, pass through a catalytic plasma field created by one or more plasma sprays disposed on the perimeter of the tower which deposit thin and essentially uniform coating of catalyst on each globule or microsphere to increase the mass thereof until the coated globule or microsphere attains a state wherein the natural gravitational forces thereon exceeds the electrostatic potential at the upper end of the tower and the sphere commences to fall in the tower back through the catalytic plasma field to be further coated and ultimately into a suitable collection means disposed therebeneath. It will be noted that both during rise and fall, each of the microspheres carry a like electrostatic charge which cause them to repel each other while traversing their designated route thereby enhancing both the efficiency and effectiveness of the catalytic coating operation and avoiding clumping between individual globules or microspheres.

The plasma spray, in one practice hereof will be arranged to impart still another electrostatic potential to the microspheres. The charge at the plasma spray will be the same potential as that carried by the attracting plate and opposite that imparted to the individual globules at the misting valve. This has the effect of allowing the plasma to literally bombard the globules by their attraction thereto while at the same time neutralizing the charge in the globules to reduce the pull of the attraction plate thereupon. This neutralization of the effect of the attraction plate upon the microsphere in turn assists the effectiveness of natural gravity in gaining control of the movement of the microsphere in the tower. Thus gravity arrests the ascending movement of the microsphere and imparts a descending movement thereto. Ultimately, the coated microspheres enter into the collection chamber disposed therebeneath.

The interrelationship of the electrostatic charge impressed on the globule as it is formed, the charge introduced by the catalytic plasma spray, and the charge applied to the attracting plate disposed in the upper reach of the tower and the downward pull of the gravitational force on the microglobules cause each globule to rise first upwardly through the plasma field for base coating and then to descend downwardly through the plasma field for finished coating. Ultimately, the coated microspheres fall into a collector disposed beneath the tower from which they are gathered and deployed to the site of their intended use. Note that the movement of the globules within the plasma field is constantly subjected to opposing forces which have the effect of braking and slowing the movement of each globule which would otherwise occur if the counteractive forces were not present. Thus, the pull of gravity slows the ascent of the microspheres and the attracting plate slows the descent of the microspheres in the tower.

For use, the formed catalyst-coated microsphere are admixed into a regular fuel oil supply in a mixer prior to ignition and combustion. During combustion, the resulting explosion of the catalyst microsphere or microshard causes the catalyst coating to be dispersed as a myriad of catalytic shards at the moment of combustion. In an alternative embodiment, the formed catalyst microsphere can be mixed directly into and with the hydrocarbon fuel just prior to ignition. The small micron sized microsphere formed pursuant hereto had a hydrocarbon core having a specific gravity suitable to insure that the coated microsphere has a neutral buoyancy when suspended in regular fuel oil or other normal hydrocarbon fuel employed for combustion. In this manner, normal molecular or Brownian movement will maintain the catalytic microspheres suspended within the incoming fuel.

The promised reduction in environmental pollutants such as the oxides of nitrogen and carbon monoxide is a direct result of the more efficient and complete combustion of the fuel and the lowered ignition temperature facilitated by the presence of the catalyst in the chamber at the time of burning.

It is thus apparent that means and methods are described herein which provide more complete combustion and hence a greater energy release from a given amount of fuel while substantially reducing the number of pollutants generated therefrom.

The exact benefit achieved will vary from application to application although it has been determined that the magnitude of the energy gain, when compared to conventional combustion without catalyst, will be governed by the catalyst employed to coat the frozen globules, the size of the microspheres, and the number of the microspheres dispersed per unit volume of the fuel being burned.

Other economic benefit is obtained by using the oil mist as a substrate which, when coated as herein described, produces a very fine catalytic product without the expense of grinding and the potential problems resulting from a dispersion of inert substrate through the combustion chamber.

As the catalytic microspheres, formed as described above, enter into the combustion zone, the fuel core superheats, forms a gas under pressure, and explodes the catalytic coating formed thereabout into a myriad of tiny shards which effectively multiplies the effective surface area by a factor substantially greater than the doubling obtainable by allowing combustion site access to both sides of the film.

Catalysts considered useful in the practice of the present invention include lithium, sodium, potassium, aluminum, iron, gallium, indium, germanium, tin, antimony, scandium, titanium, vanadium, chromium, platinum, palladium, calcium, manganese, yitrium and zirconium or alloys and mixtures thereof.

In current internal combustion engines, the useful particle size of the microspheres produced hereby is limited by the diameter of the mesh of the fuel filter employed in the fuel line of the combustion chamber be fed thereby. Thus, when a conventional fuel filter having a 12 micron filter diameter is employed, the microspheres employed therewith will be between 1 and 12 microns in diameter. The use of larger size filters will enable larger microspheres to be used to give the benefit described herein.

To further assist in the understanding of the present invention, and not by way of limitation, the following examples are presented:

EXAMPLE 1

A catalyst substrate was formed by the atomization of light fuel oil into a freezing environment to form frozen fuel oil pellets having a diameter of about 3 microns. A coating of lithium was applied by a plasma spray operating at a temperature of at least 186° C. to provide each pellet with a coating of lithium of about 1 micron thickness. The process produced about 1.1 billion microspheres per pound of lithium.

EXAMPLE 2

A catalyst substrate was formed by the atomization of light fuel oil into a freezing environment to form frozen fuel oil pellets having a diameter of about 3 microns. A coating of calcium was applied by a plasma spray operating at a temperature of at least 849° C. to provide each pellet with a coating of calcium of about 1 micron thickness. The process produced about 3.73 million microspheres per pound of calcium.

EXAMPLE 3

A catalyst substrate was formed by the atomization of light fuel oil into a freezing environment to form frozen fuel oil pellets having a diameter of about 3 microns. A coating of iron was applied by a plasma spray operating at a temperature of at least 1540° C. to provide each pellet with a coating of iron of about 1 micron thickness. The process produced about 73 million microspheres per pound of iron.

EXAMPLE 4

A catalyst substrate was formed by the atomization of light fuel oil into a freezing environment to form frozen fuel oil pellets having a diameter of about 3 microns. A coating of palladium was applied by a plasma spray operating at a temperature of at least 1550° C. to provide each pellet with a coating of palladium of about micron thickness. The process produced about 48 million microspheres per pound of palladium.

EXAMPLE 5

A catalyst substrate was formed by the atomization of light fuel oil into a freezing environment to form frozen fuel oil pellets having a diameter of about 11 microns. A coating of mixed aluminum and tin was applied by a plasma spray operating at a temperature of at least 661° C. to provide each pellet with a coating of 50—50 (v/v) aluminum and tin of about 2 micron thickness. The process produced about 18 million microspheres per pound of metal.

From the foregoing, it becomes apparent that new and useful procedures have been herein described and illustrated which fulfill all of the aforestated objectives in a remarkably unexpected fashion. It is of course understood that such modifications, alterations and adaptations as may readily occur to an artisan having the ordinary skills to which this invention pertains are intended within the spirit of the present invention which is limited only by the scope of the claims appended hereto.

Accordingly, what is claimed is:

1. A method of producing a catalytically-coated microsphere for use in facilitating the efficiency of hydrocarbon fuel combustion while reducing the quantity of environmental pollutants resulting therefrom, said method comprising the steps of: passing light fuel oil through an electrostatically charged misting means into a refrigerated area to form a plurality of frozen oil pellets having an electrostatic charge; drawing said electrostatically charged pellets upwardly in response to an attracting electrostatic force through a plasma field of a catalyst selected from the group consisting of lithium, sodium, potassium, aluminum, iron, gallium, indium, germanium, tin, antimony, scandium, titanium, vanadium, chromium, platinum, palladium, calcium, manganese, yitrium and zirconium or alloys and mixtures thereof to deposit sufficient catalyst on said pellets to form a coated microsphere having sufficient mass to overcome said upwardly attractive electrostatic force and respond to gravitational force thereupon; allowing said coated microsphere to descend back through said plasma field and obtain an additional deposit of catalyst thereupon; and collecting said coated microspheres for subsequent introduction with a hydrocarbon fuel into a hydrocarbon combustion chamber.

2. A method according to claim 1 in which said pellets are at least 1 but less than 2000 microns in diameter.

3. A method according to claim 2 in which said pellets are less than 100 microns in diameter.

4. A method according to claim 1 in which said coated microspheres contain a liquid hydrocarbon center.

5. A method according to claim 2 in which said coated microspheres contain a liquid hydrocarbon center.

6. A method according to claim 3 in which said coated microspheres contain a liquid hydrocarbon center.

7. A method according to claim 4 in which said center is light fuel oil.

8. A method according to claim 5 in which said center is light fuel oil.

9. A method according to claim 6 in which said center is light fuel oil.

10. A method according to claim 1 in which said plasma field has an applied electrostatic charge opposite to and having a magnitude less than that of the charge applied to said pellets.

11. A method according to claim 3 in which said plasma field has an applied electrostatic charge opposite to and having a magnitude less than that of the charge applied to said pellets.

12. A method according to claim 7 in which said plasma field has an applied electrostatic charge opposite to and having a magnitude less than that of the charge applied to said pellets.

13. A method according to claim 9 in which said plasma field has an applied electrostatic charge opposite to and having a magnitude less than that of the charge applied to said pellets.

14. A method according to claim 4 in which said plasma field has an applied electrostatic charge opposite to and having a magnitude less than that of the charge applied to said pellets.

15. A method according to claim 6 in which said plasma field has an applied electrostatic charge opposite to and having a magnitude less than that of the charge applied to said pellets.

16. A method according to claim 1 in which said electrostatically charged pellets are introduced into a vertically extending coating tower having a proximal end and a distal end, said misting means being disposed adjacent said proximal end of said tower and an electrostatic source means having an electrostatic potential sufficient to draw said pellets theretoward being disposed at said distal end.

17. A method according to claim 16 in which said pellets are less than 100 microns in diameter.

18. A method according to claim 17 in which said coated microspheres contain a liquid hydrocarbon center.

19. A method according to claim 18 in which said center is light fuel oil.

20. A method according to claim 19 in which said plasma field has an applied electrostatic charge opposite to and having a magnitude less than that of the charge applied to said pellets.

* * * * *